Oct. 9, 1962 — W. E. PATTERSON ET AL — 3,057,384
JIG FOR PREFABRICATING GABLES
Filed Jan. 19, 1961 — 9 Sheets-Sheet 1

INVENTORS
WILLIAM E. PATTERSON, JOHN F. LONG,
BOB E. TERRY & MILTON J. BEATY
BY
McMorrow, Berman & Davidson
ATTORNEYS

Oct. 9, 1962 W. E. PATTERSON ET AL 3,057,384
JIG FOR PREFABRICATING GABLES
Filed Jan. 19, 1961 9 Sheets-Sheet 3

INVENTORS
WILLIAM E. PATTERSON, JOHN F. LONG,
BOB E. TERRY & MILTON J. BEATY
BY

ATTORNEYS

Oct. 9, 1962 W. E. PATTERSON ET AL 3,057,384
JIG FOR PREFABRICATING GABLES

Filed Jan. 19, 1961 9 Sheets-Sheet 5

INVENTORS
WILLIAM E. PATTERSON, JOHN F. LONG,
BOB E. TERRY & MILTON J. BEATY
BY

McMorrow, Berman & Davidson
ATTORNEYS

United States Patent Office 3,057,384
Patented Oct. 9, 1962

3,057,384
JIG FOR PREFABRICATING GABLES
William E. Patterson and John F. Long, Phoenix, Bob E. Terry, Glendale, and Milton J. Beaty, Phoenix, Ariz., assignors to John F. Long Properties, Inc., a corporation of Arizona
Filed Jan. 19, 1961, Ser. No. 83,751
16 Claims. (Cl. 144—318)

This invention relates to prefabricated structures, and in particular to the construction of a unit constituting the gable end of a roof. Although many proposals have heretofore been advanced for prefabricating roof structures by means of jigs, these were limited to simple truss units, whereas the present invention goes much further in providing for a unit of substantial depth, and which is complete with sheathing, siding and trim.

It is therefore an object of the invention to prefabricate a roof unit which extends substantially in three dimensions. More particularly it is an object to prefabricate a roof section which forms the gable end of the roof. Another object is to provide a jig for the ready fabrication of a gable unit, and also to provide a jig having features whereby all nailing may be completed prior to removal of the unit from the jig.

The foregoing, and other objects, are attained by the present invention, which may be briefly described as a swingably mounted, triangular table, in the form of a roof truss, having guides for laying the vertical struts of the truss, and having pockets extending perpendicularly to the table and adapted for positioning the timbers which serve to connect the gable to its adjacent roof truss, or A-frame, in spaced relation thereto, and the system including means for swinging the table, means for compressing the gable parts into position, and means to adjust the assembled structure with respect to the frame to facilitate nailing. In addition, the jig also has fixed features which are designed to facilitate nailing.

For a more detailed description of the invention, reference is made to the following specification, as illustrated in the drawings, in which:

FIGURE 1 is a perspective view of the jig, on its swing mounting, and in the horizontal, working position of the layout table.

For a readier understanding of the structure, purposes, and function of the jig mechanism, it will be helpful to first consider the structure of the completed gable unit. Thus, referring to the drawings by characters of reference, and particularly FIGURES 14 to 20, there is shown a framed gable unit structure having a base or chordal beam 10, rafters 12, 14, uprights 146 of varying size, and cross pieces 152 defining a window, lower connecting timbers 17, which extend rearwardly and perpendicularly from beam 10, and are structurally in the nature of ceiling joists; upper connecting timbers 18, parallel to timbers 17, which are received in notches 20 in rafters 12 and 14, and which have extensions 22 forwardly of the gable truss, constituting lookouts for the roof overhang, and to the ends of which are attached the barge boards 24 and 26. A sheet of paper sheathing 28 covers the outer face of the gable truss framing, and is overlaid by siding 30 which is provided with trim 32. Forwardly of the gable truss, the lookouts 22 are covered with roof sheathing 34 of plywood, the forward edge of which is covered with a trim strip 36. The foregoing parts will be referred to, in part by way of explaining the jig, and in part in connection with assembly steps while the work is still in the jig.

Figure 2:
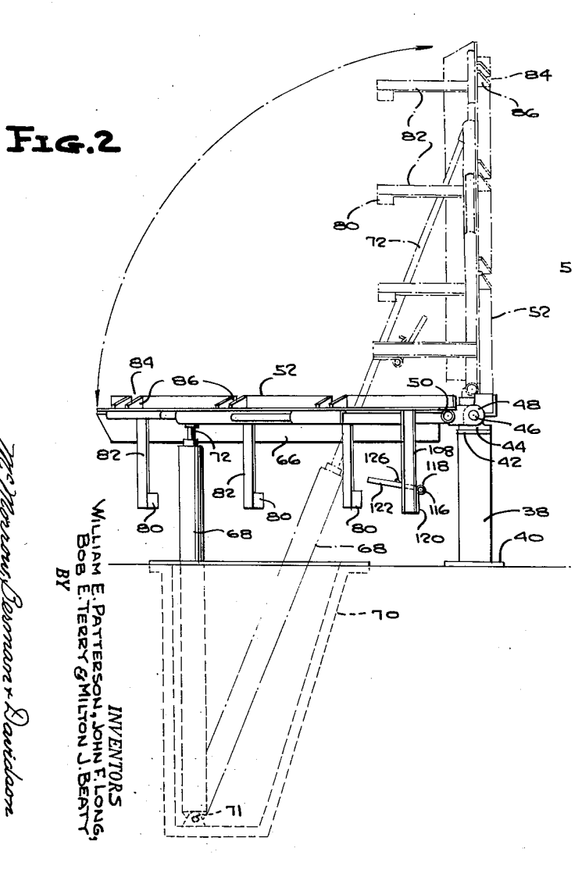
FIGURE 2 is an end, elevational view of the jig of FIGURE 1, as seen from the lower left corner of the jig in that figure, and showing the upright position of the jig in broken lines.
Figure 3:
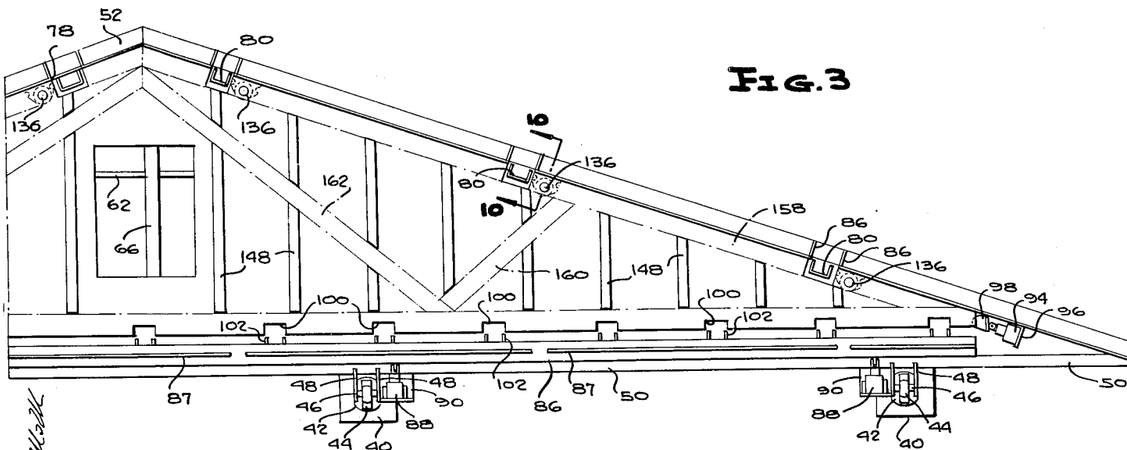
FIGURE 3 is a top plan view of the jig of FIGURE 1.
Figure 4:
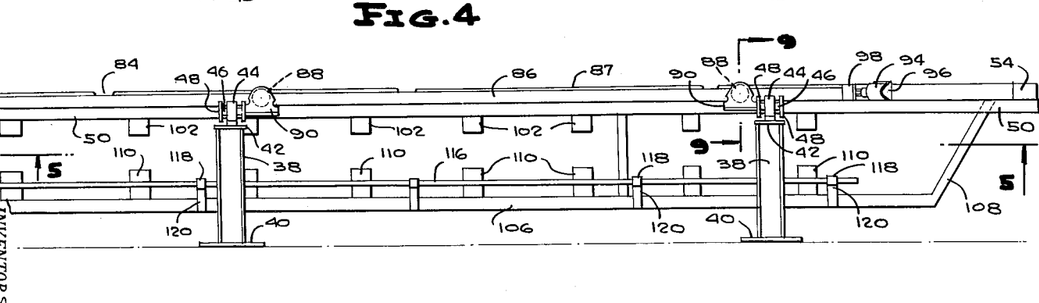
FIGURE 4 is a front elevational view of the system shown in FIGURE 3.
Figure 5:
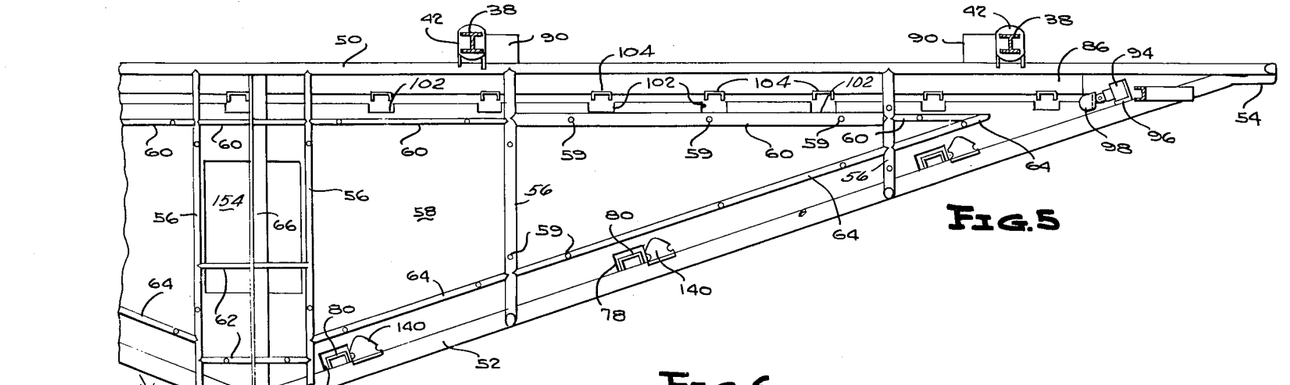
FIGURE 5 is a plan view of the jig table, showing the under side thereof, as seen along the plane of line 5—5 in FIGURE 4.
Figure 6:
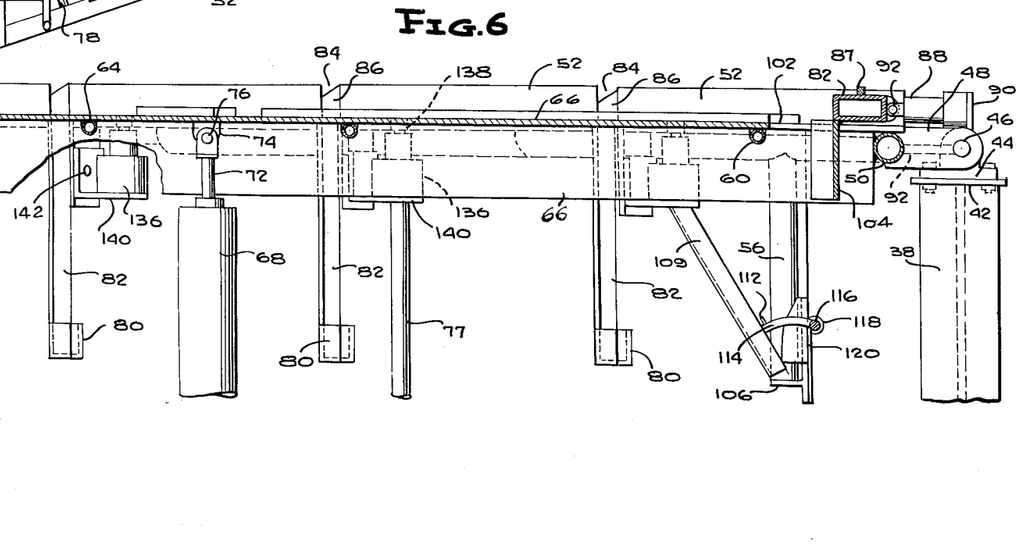
FIGURE 6 is a sectional view through the middle line of symmetry of the jig table, as seen along the line 6—6 of FIGURE 1, FIGURE 7 (sheet 1) is a sectional view of a portion of the jig, as seen along the line 7—7 of FIGURE 1, FIGURE 8 (sheet 5) is a perspective view of the jig and mounting, showing the jig in upright position, and viewed from the rear to show the under side of the table, FIGURE 9 (sheet 2) is a sectional view of a detail, taken along the line 9—9 of FIGURE 4.

The jig assembly is mounted for swinging movement about a horizontal axis on four pedestals 38 each with base plate 40, and top plate 42 (FIG. 20) supporting axially aligned pillow blocks 44 journalling shafts 46 carried by pairs of brackets 48 fixed to a cross tube 50 which forms the fixed base or chordal member of the jig frame. The frame, seen to best advantages in FIGURE 5, is completed, in its peripheral, triangular form, by a pair of slant members 52 of angle iron, meeting at the apex of the frame, and each having a short bent section 54 at its outer end, by means of which they are secured as by welding to the base tube 50. The framework also has a series of transverse tubular members perpendicular to the base, and running from the base to the slant members, all indicated by the numeral 56, which serve to strengthen the frame, and also as a support for a triangular panel of plywood 58 (FIG. 5) which is secured by bolts 59 to the several tubular frame elements, and serves as a layout table for the truss pieces. The framework also includes a series of tubular sections 60 arranged parallel to, and spaced slightly inwardly of, the base 50, a pair of sections 62, also parallel to the base, but near the apex, and sections 64, parallel to and spaced slightly inwardly of the slant sides 52. The frame has special reinforcement in an angle iron section 66 running from the center of the base to the apex. The outwardly extending flange of angle iron 66 also serves for attachment of the frame-lifting mechanism comprising a cylinder 68 (FIGS. 6 and 8) housed in a well 70 (FIGS. 2 and 8) in the shop floor, where it is pivotally mounted at 71, and having a piston rod 72 pivotally attached to a bracket 74 (FIG. 6) on the under side of member 66 by means of a pin 76. Ground-engaging legs 77 (FIGS. 6, 8) carried by sides 52 hold the frame in the horizontal, working position.

Figures 8, 11:
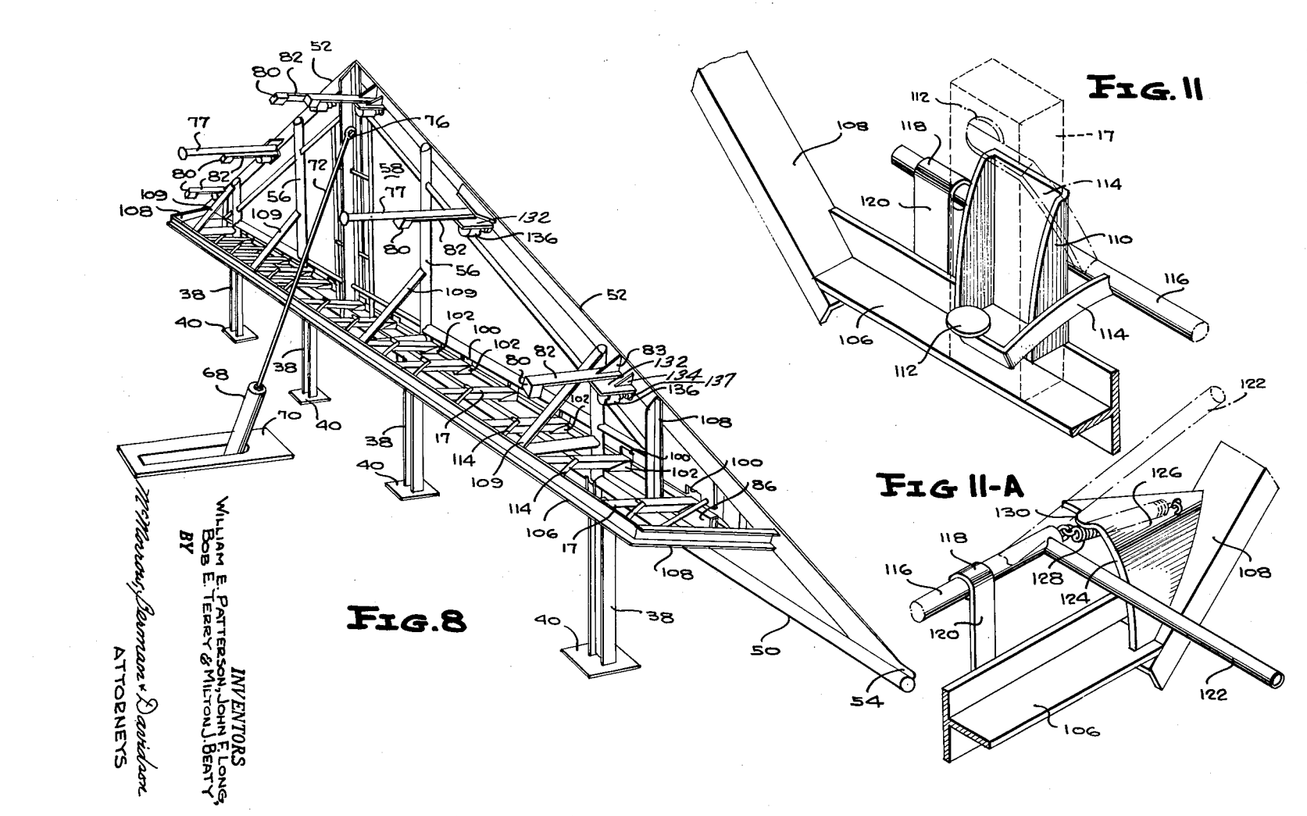
Figure 9:
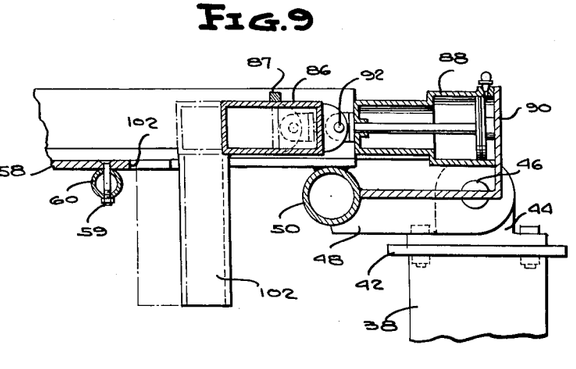
Figure 10:
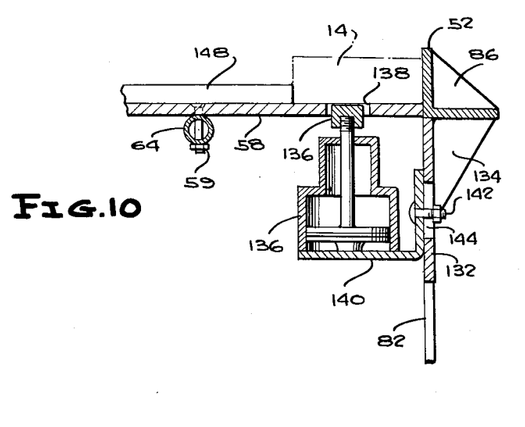
FIGURE 10 is a sectional view of a detail, taken along the line 10—10 of FIGURE 3, FIGURE 11 (sheet 5) is a perspective view of a detail, showing the clamp means for the truss-connecting timbers, FIGURE 11-A is a perspective view of another detail showing the locking latch for the clamp of FIGURE 11.
Figure 20:
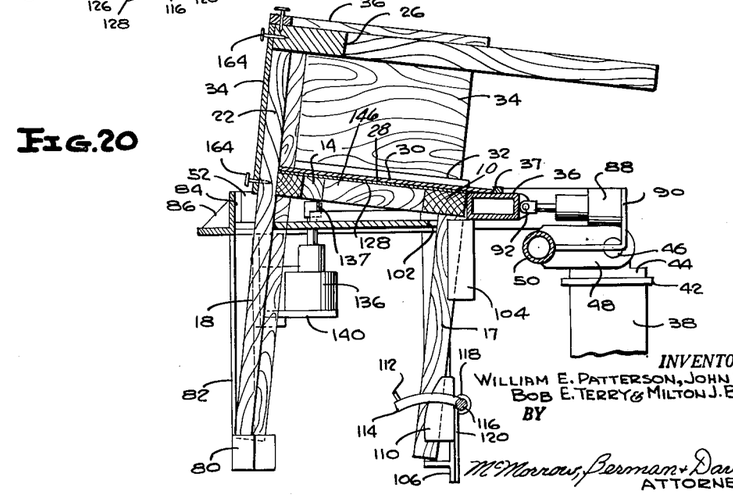
FIGURE 20 is a sectional view taken on the line 20—20 of FIGURE 19.
Figures 21, 22:
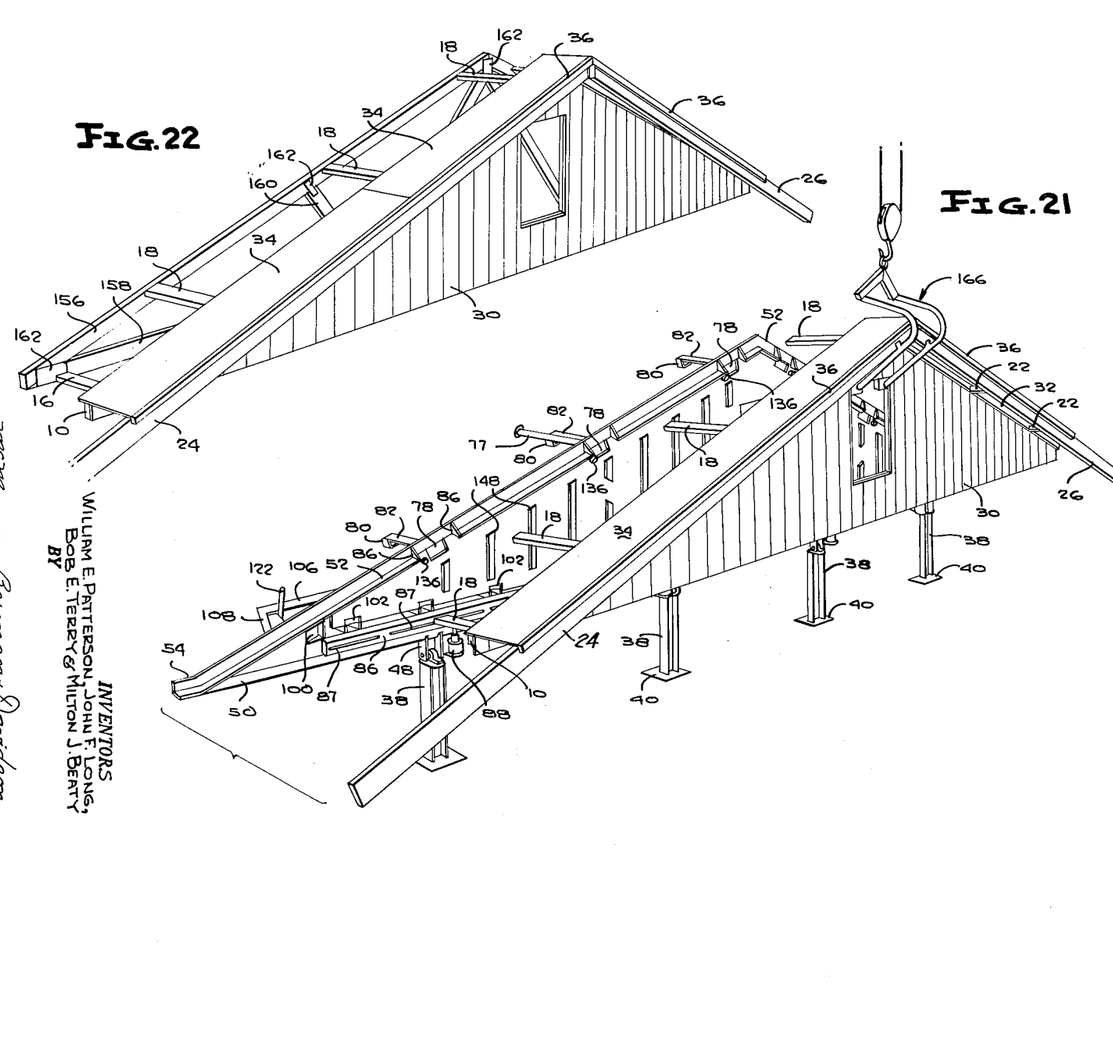
FIGURE 21 is a perspective view of the jig, with the table in upright position, showing the gable in the process of removal from the jig.
FIGURE 22 is a perspective view of the gable, showing the interior roof truss attached to the rear ends of the connecting timbers.

The rafters 12 and 14 of the gable truss, are placed, in the layout, against the slant angle irons 52 of the frame, and as best seen in FIGURE 21 as well as FIGURE 5, the plywood panel has notches 78 in its slant edges to pass the inner sections 18 of the upper lookouts 22, the notches 78 being somewhat larger than the notches 20 in the rafters 12, 14 with which they coincide and which receive the extensions 18 in the final assembly. A stop for the lower end of each section 18 is provided in a rectangular socket 80 (FIGS. 20, 21) carried on the outer end of a length of angle iron 82 which is welded to and extends perpendicularly from frame member 52, being braced thereat by a triangular web plate 83 (FIG. 8). For access to the lookouts 22, so that they may be nailed to the rafters while in the jig, angle irons 52 are provided with notches 84 and parts of the flange in which the notches are formed are bent back in triangular tabs 86, which are welded to the other flange, and strengthen the member to overcome the weakening effect of the notches.

While tube 50 is part of the fixed frame, the actual, working base or chordal member is a tubular bar 86 of rectangular cross-section, of about the same thickness as the timbers of the truss, and having a series of aligned stops 87 on its upper face to position gable sliding 30. This base member is movable perpendicularly to its length, that is, toward and from the frame apex, by means of air cylinders 88 (FIGS. 20, 21), each mounted on a platform 90, attached to tube 50 and one of each pair of pivot brackets 48, and with its piston rod pivotally connected to lugs on member 86 by a pin 92. The purpose of this movable base is to compact the truss members in one direction after the layout and prior to nailing. Compacting in a direction perpendicular to this is accomplished by cylinder 94 (FIG. 1) carried by a bracket 96, welded to the inner side of one of the slant angle bars 52, near its outer end, and with its piston rod pivotally carrying a presser foot 98 adapted to engage the end edge of a rafter. The outer end of the opposite rafter is held against movement during this lateral compacting, by a fixed stop 100, of generally channel form, one side of which is secured, as by welding, to the slant member 52, but which may also be arranged for adjustment to different positions to suit whatever rafter length is involved. This applies also, of course, to the mounting of cylinder 94.

The plywood table 58 has a series of rectangular slots 102 in its base edge to slidingly receive the ceiling joist timbers 17, and position their outer ends, in the truss layout, underneath and flush with one face of the base truss member 10. In furtherance of this same object, the pusher beam 86 has welded to its outer, lower corner, a series of channel-form guides 104 extending perpendicularly from the frame; that is, downward when the frame is in working position. The lower supports or receiving pockets 110 for the joists 17 are carried on a cross beam 106 (FIGURES 8 and 11) of T-section, underslung from slant sections 52, respectively, near their ends, by connector bars 108 of channel section, and braced by diagonal angle bars 109 connecting with various parts of the framework. On the top edge of the cross flange of beam 106 are welded the series of channel-form receivers or pockets 110, each aligned with one of the upper pockets or guides 102. The medial flange or upright of the beam 106 forms the bottom rest for the inner ends of the joists 17. The joists are held in place against the lower channel guides by a series of buttons 112 of the disc form, each carried on the outer end of an L-shaped arm 114 which is in turn fixed to a shaft 116, mounted for oscillation in bushings 118 formed by bending the upper end of straps 120 secured to the T-beam 106, the buttons being adapted to make flat engagement with the faces of joists 17 when positioned in the truss layout in the jig. The shaft 116 is turned manually, by means of a lever arm 122, biased against the outer edge 124 of an arcuate plate 126 on one of the beam supports 108 by a tension spring 128 secured to shaft 116 and to the plate 126, and the buttons are held in clamping position by latching action of a rounded finger 130 on the plate 126 after the lever arm 122 passes thereover and is held against return by tension of the spring 128.

It is, of course, desirable, in the spirit of the invention that the entire assembly be effected prior to removal of the gable unit from the jig, and since the tight fit of the truss, in the jig is not conducive to either insertion of the roof sheathing 34, or nailing it to the rafter 14, provision is made for tilting the apex of the truss upward from the jig in a swinging movement about the movable jig beam 86 (FIGURE 20). To this end, slant members 52 have welded to their lower flanges a series of depending plates 132, braced by triangular webs 134, each mounting an air cylinder 136 with a free-ended piston rod head 137 adapted to move through openings 138 in the plywood panel of the jig and contact the rafters 12, 14 to raise the apex end of the truss an amount sufficient to raise the rafters a small distance above the vertical flanges of slant jig members 52, so that the roof sheathing 34 may be laid in place and nailed to the rafters (FIG. 20). The air cylinder is mounted for adjustable positioning by means of a bracket 140 secured by a bolt 142 (FIG. 15) in a vertical slot 144 in the plate 132.

Figures 1, 7:
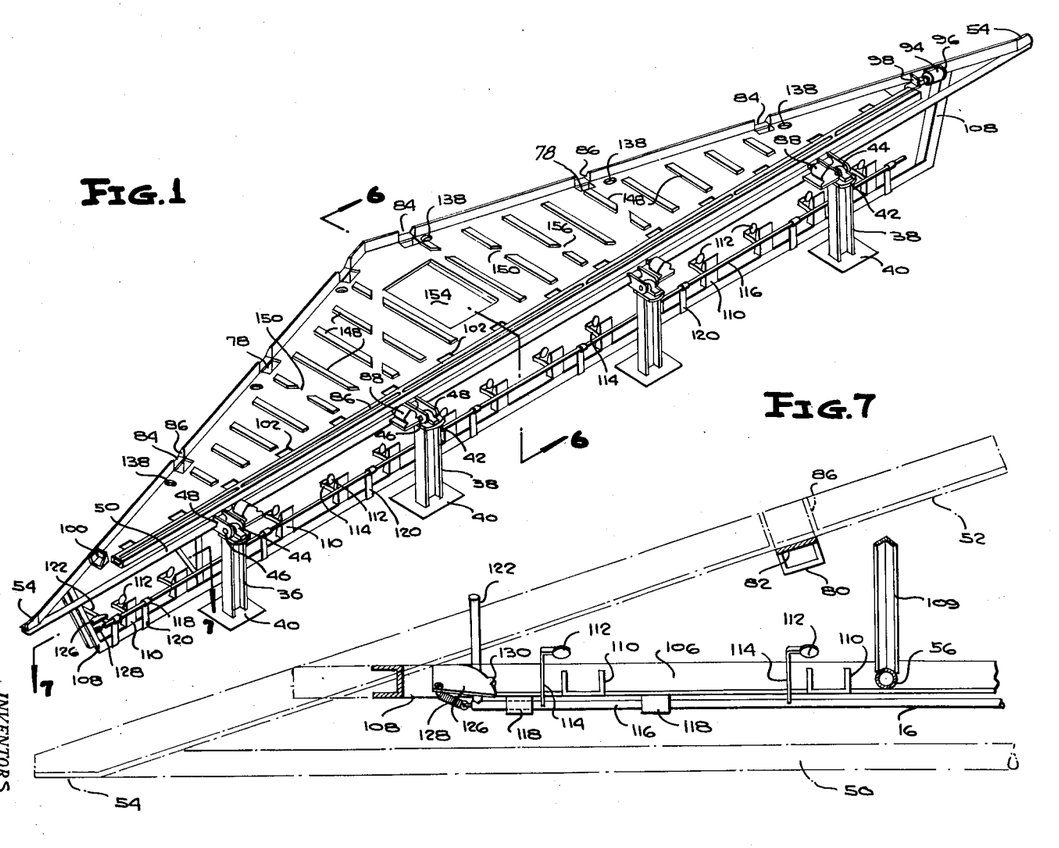
Figure 12:
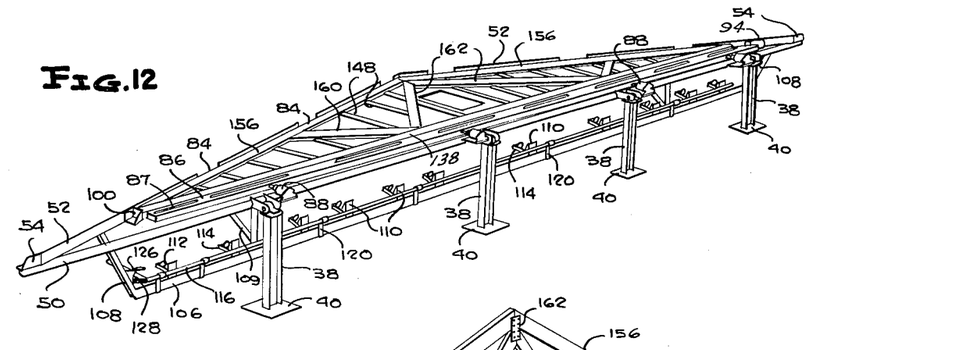
FIGURE 12 is a view similar to FIGURE 1, showing the layout, in the jig, of the timbers for the interior truss of the gable unit, in an alternative use of the jig.

For locating the uprights 146 in the gable truss (FIGURES 14 and 16), a series of cleats 148 (FIGS. 1, 2) are glued or nailed to the plywood panel 58, and one side of an upright is abutted against these in the layout process. As seen in FIGURE 1, certain of the cleats have openings 150 aligned along lines which are diagonal with respect to the truss, for laying out a truss with diagonal bracing, in an alternative use, such as shown in FIGURE 12. To frame the window in the gable, two horizontal pieces 152 (FIG. 14) are laid along the bottom and top edges of a rectangular opening 154 (FIG. 5) in the panel 58.

Figure 13:
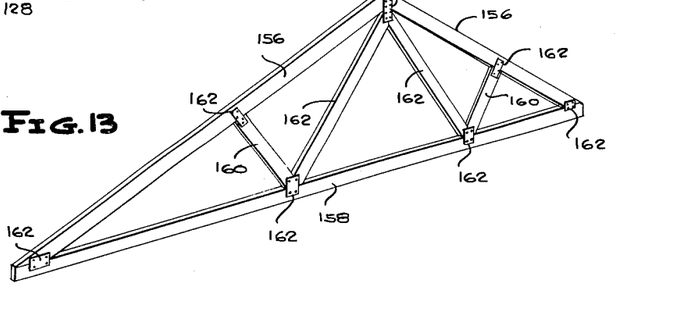
FIGURE 13 is a perspective view of the truss assembled from the layout of FIGURE 12.
Figure 14:
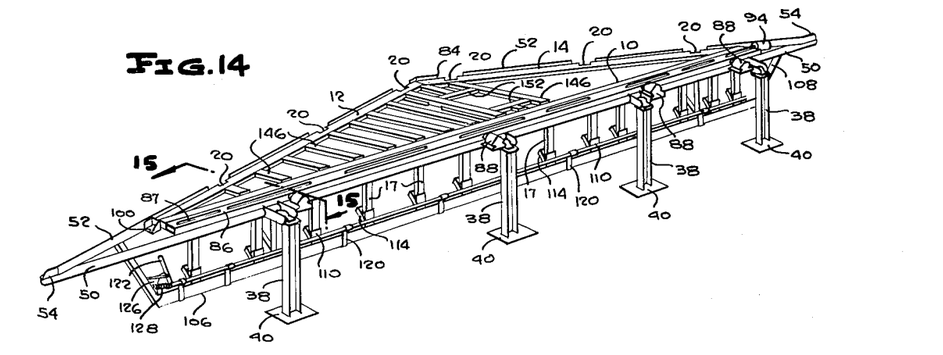
FIGURE 14 is a view similar to FIGURE 12 showing the alternative layout, in the jig, for the outer truss of the gable unit.
Figure 15:
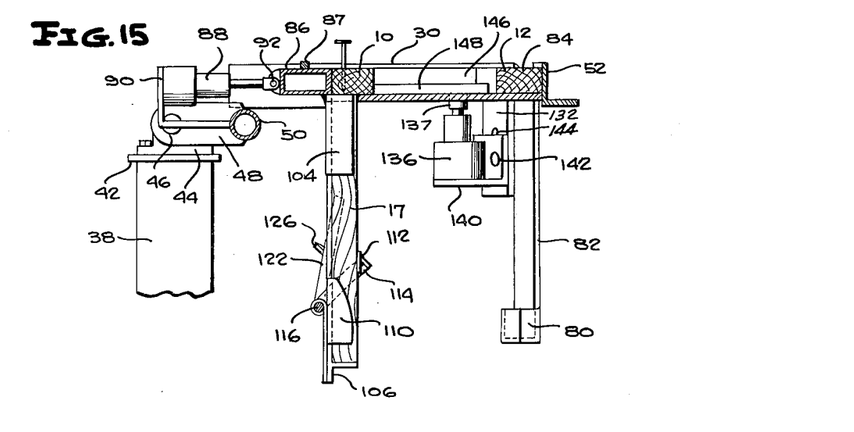
FIGURE 15 is a sectional view taken along the line 15—15 of FIGURE 14.

Having thus described the apparatus, the procedure in fabricating a complete gable unit will now be detailed. Preferably, the diagonally braced truss shown in FIGURE 13, which is attached to the rear of the gable unit will first be assembled and nailed together, utilizing the alternative feature in the jig. Thus, with the jig in horizontal position, as in FIGURE 12, rafters 156, are laid along slant sides 52 of the jig, base member 158 is laid along the pusher beam 86, and diagonal struts 160, 162 are laid in the passages 150 which interrupt the cleats 148. The truss is then compacted by means of cylinders 88 and cylinder 94, and the truss members secured by joint plates, all indicated by the numeral 162 (FIG. 13). Thereafter, the cylinder pressure is released, and the truss removed from the jig, and the joint plates may then be added on the other side of the truss. This truss may also be fabricated by the jig shown in co-pending application Serial No. 83,765, filed January 19, 1961 wherein all nailing is done prior to removal from the jig. This truss is now put aside for later attachment to the gable unit, as a last step.

Figure 17:
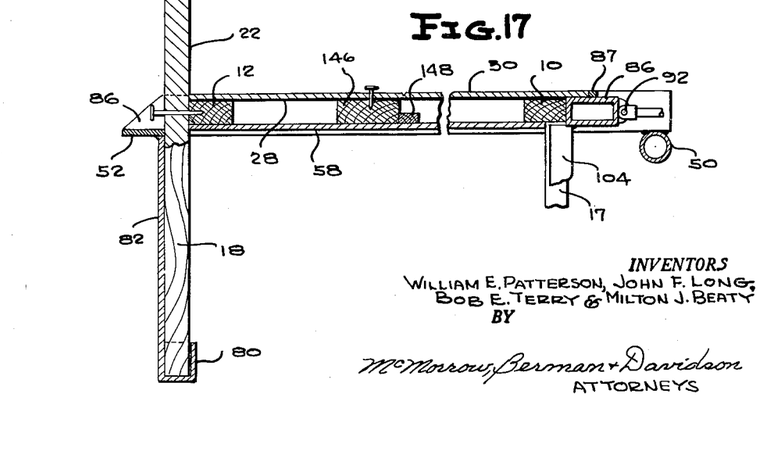
FIGURE 17 is a sectional view taken on the line 17—17 of FIGURE 16.
Figure 18:
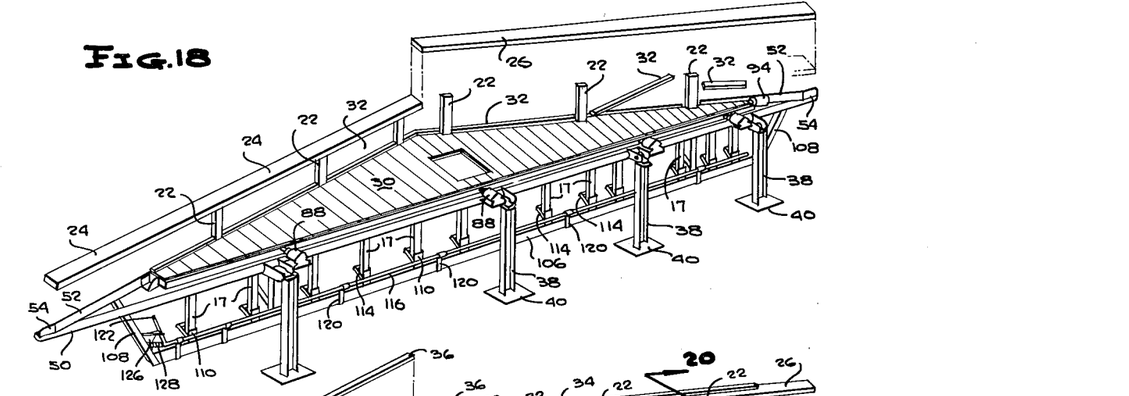
FIGURE 18 is a view similar to FIGURE 16, showing the mounting of the barge on the ends of the gable lookouts, and edge trim on the siding.
Figure 19:
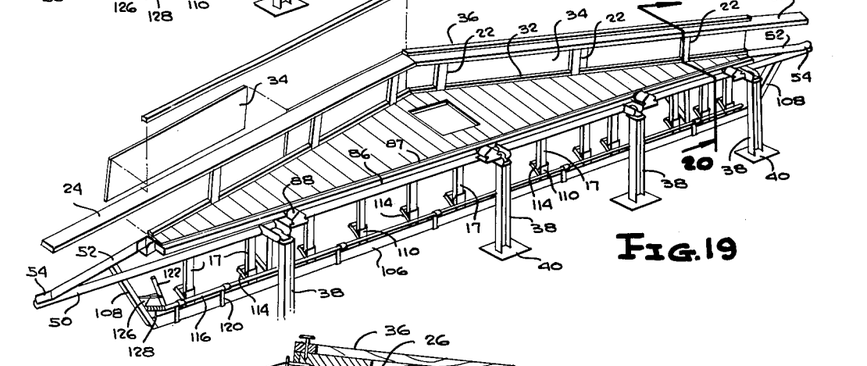
FIGURE 19 is a view similar to FIGURE 18 showing the steps of adding the roof sheathing and the trim therefor.

Fabrication of the gable unit may commence with the jig in the upright position shown in FIGURE 8, in which position it would be for convenient removal of the assembled rear truss, or after removal of a complete gable unit, as the case may be. With the jig in this position the ceiling joists 17 are easily laid in place in channel pockets 104 and 110, with bottom ends resting against the medial flange of T-beam 106, whereupon the pieces may be clamped in place by buttons 112 by actuation of crank arm or lever 122 past the latch finger 130. The jig may then be lowered to horizontal position, following which the rear sections 18 of lookouts 22 may be dropped through notches 78 in the plywood table and lowered into the receiving sockets 80. This leaves the lookout sections 22 extending above the jig, as seen in FIGURE 17. Next, the truss rafters 12, 14 are laid in abutment with slant sides 52 of the jig, and with their notches 20 receiving the lookouts 22. The base, or chordal member 10, of the truss may then be laid along pusher bar 86, overlying the upper ends of ceiling joists 17. Uprights 146 are then laid in place between the rafters and base, and abutting the positioning cleats 148, and the horizontal members 152 are laid in place above and below the window. Next the cylinders 88 are actuated to move bar 86 to compact the studding toward the apex, followed, after a very slight interval, by actuation of cylinder 94 to compact the truss from the opposite sides. The truss members are then secured in assembled relation, as by joint plates, or other convenient means.

Figure 16:
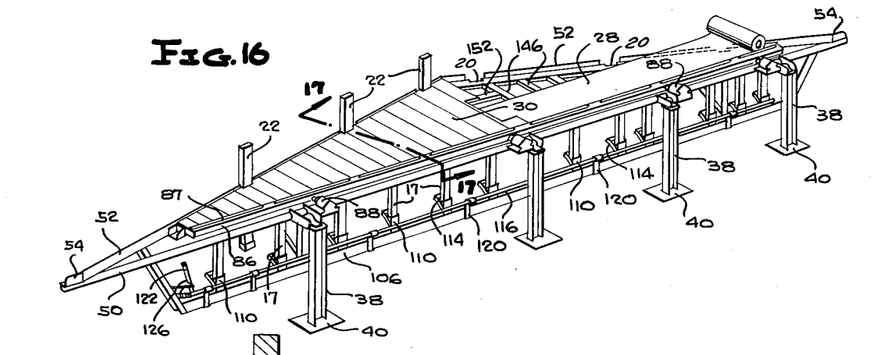
FIGURE 16 is a view similar to FIGURE 14, showing the successive overlay of paper sheathing and of siding, on the gable truss.

The next following steps are best seen in FIGURE 16, wherein the paper sheathing 28 is shown as having been rolled across the face of the truss, followed by laying of the siding 30, which may be of one-piece construction with markings to simulate separate boards. The siding and paper have central openings to clear the window opening, and also notches to clear the lookouts 22. If separate boards are used in the siding, the beads 87 on the top of pusher bar 86 will guarantee a straight lower edge. After the siding is on, the trim 32 is applied along its upper slant edges, in segments extending between the lookouts 22 after which the barge pieces 24, 26 are nailed to the outer ends of the lookouts 22. The gable unit is now ready for the roof sheathing, and therefore the compacting pressure is released from the truss, and the gable tilted, as in FIGURE 20, by cylinders 136. Thereafter, the roof sheathing 34 is laid in place and secured by nails 164 to rafters 12, 14 and to barge pieces 24, 26. The line between barge and sheathing is then covered by trim strips 36. The truss is then dropped from tilted position by deactivation of cylinder 136, and the jig, together with the gable unit is brought to upright position by actuation of cylinder 68, following which the gable is removed away from the jig as by a crane hook 166 (FIG. 21). The truss of FIGURE 13 is then nailed to the rear edges of extensions 18 and joists 17, and the gable is ready to be attached to a house structure.

While a certain preferred embodiment has been shown and described, the same will be subject to various modifications which will be obvious to those skilled in the art, in the light of this disclosure, and the invention should not, therefore, be deemed as limited except insofar as shall appear from the spirit and scope of the appended claims.

We claim:

1. A jig for prefabricating gable units for buildings comprising a series of pedestals having axially aligned bearing means, and a triangular frame in the general form of a roof truss mounted for swinging movement about the axis of said bearing means, said frame having a fixed tubular base with outwardly extending brackets journalled by pins in said bearing means, and having slant sides meeting in an apex, said sides being of angle iron with one flange extending outwardly of the frame and the other perpendicular thereto and constituting a positioning stop for a truss rafter, a limit stop for the end of a rafter on one of said sides, power means on the other of said sides for contacting the other rafter to compress the truss layout, a network of cross members within the area of said frame, a layout panel affixed to said members and occupying a substantial part of the area of said frame, a tubular base member of rectangular section arranged for movement in a direction perpendicular to said fixed base, a bead on the outer surface of said movable base member, power means on said pedestals arranged to move said latter base member, the outer flanges of said slant sides having a series of notches, a strap with a receiving pocket on its lower end depending in normal horizontal position of said frame from said slant sides at each said notch, a notch in said panel at each notch in said slant sides, said frame having a truss section adjacent said fixed base, parallel thereto, and extending perpendicularly from the plane of the main frame, a series of struts in said truss section, and diagonal struts between said truss section and the main frame, said panel having a series of notches in its edge adjacent the base members of the frame, and a series of positioning cleats for truss struts, a series of channel members depending in normal horizontal position of said frame from said movable base with their channels facing the interior of the frame and aligned with the base notches in the panel, the lower beam of said truss section being of T section with the medial flange extending perpendicularly to the plane of said truss section toward the interior of the frame, a series of channel guides carried by said lower beam and disposed in continuation of the respective, upper channel members, clamp means on said lower beam for holding a truss member in said channel guides while resting on the middle flange of said beam, a plurality of legs carried by said frame and constituting a ground support with the frame in horizontal position, power means carried by said slant sides of the frame and adapted to swing the assembled truss upwardly about an axis parallel to and adjacent the base of the main framework, and power means to swing the entire framework about the axis of the bearings on said pedestals.

2. A jig for prefabricating gable units for buildings comprisng a series of pedestals having axially aligned bearing means, and a triangular frame in the general form of a roof truss mounted for swinging movement about the axis of said bearing means, said frame having a fixed base journalled in said bearing means and fixed, slant sides meeting in an apex and having positioning means for the rafters of a truss, including an end stop and compacting means, a network of cross members within the area of said frame, and a triangular layout panel secured to said cross members and having notches in its slant sides and in its base, and a series of cleats for positioning truss struts, a movable base member arranged for movement in a direction in the plane of the frame and perpendicular to the base of the frame, power means to move said base member, a series of legs depending from the slant sides of the frame, in normal horizontal position of said frame, adjacent the notches in said panel, and having receiving pockets on their lower ends, said slant sides having openings for access to the truss as laid out in the jig, said frame having a section extending perpendicularly therefrom, adjacent the base thereof, upper guide members on said movable base adjacent the notches in the base of said panel, depending perpendicularly from said frame, in normal horizontal position of said frame, and lower guide members on the said section of said frame and aligned with the respective, upper guide members, stop means on said section for supporting truss members received in said guide members, clamp means for holding the truss members in the guide members, ground contact means carried by said frame and adapted to hold the main frame in horizontal position, power means carried by the slant sides of said frame and adapted to swing the assembled truss upwardly about an axis parallel to and adjacent the base of the main frame, and power means to swing the entire framework about the axis of said bearing means.

3. A jig for prefabricating gable units for buildings comprising a series of pedestals having axially aligned bearing means, and a triangular frame in the general form of a roof truss mounted for swinging movement about the axis of said bearing means, said frame having a fixed base journalled in said bearing means and fixed, slant sides meeting in an apex and having positioning means for the rafters of a truss, including an end stop and compacting means, and a triangular layout panel secured to said frame, and having notches in its slant sides and in its base, and a series of cleats for positioning truss struts, a movable base member arranged for movement in a direction in the plane of the frame and perpendicular to the base of the frame, power means to move said base member, a series of legs depending from the slant sides of the frame, in normal horizontal position of said frame, adjacent the notches in said panel, and having receiving pockets on their lower ends, said slant sides having openings for access to the truss as laid out in the jig, said frame having a section extending perpendicularly therefrom, adjacent the base thereof, upper guide members on said movable base adjacent the notches in the base of said panel, depending perpendicularly from said frame in normal horizontal position of said frame, and lower guide members on the said section of said frame and aligned with the respective, upper guide members, stop means on said section for supporting truss members received in said guide members, clamp means for holding the truss members in the guide members, ground contact means carried by said frame and adapted to hold the main frame in horizontal position, power means carried by the slant sides of said frame and adapted to swing the assembled truss upwardly about an axis parallel to and adjacent the base of the main frame, and power means to swing the entire framework about the axis of said bearing means.

4. A jig for prefabricating gable units for buildings comprising a series of pedestals having axially aligned bearing means, and a triangular frame in the general form of a roof truss mounted for swinging movement about the axis of said bearing means, said frame having a fixed base journalled in said bearing means, and fixed, slant sides meeting in an apex and having positioning means for the rafters of a truss, including an end stop and compacting means, and a triangular layout panel secured to said frame and having notches in its slant sides and in its base, and a series of cleats for positioning truss struts, a movable base member arranged for movement in a direction in the plane of the frame and perpendicular to the base of the frame, power means to move said base member, a series of legs depending from the slant sides of the frame, in normal horizontal position of said frame, adjacent the notches in said panel, and having receiving pockets on their lower ends, said slant sides having openings for access to the truss as laid out in the jig, said frame having a section extending perpendicularly therefrom, adjacent the base thereof, upper guide members on said movable base adjacent the notches in the base of said panel, depending perpendicularly from said frame, in normal horizontal position of said frame, and lower guide members on the said section of said frame and aligned with the respective, upper guide members, stop means on said section for supporting truss members received in said guide members, clamp means for holding the truss members in the guide members, power means carried by the slant sides of said frame and adapted to swing the assembled truss upwardly about an axis parallel to and adjacent the base of the main frame, and power means to swing the entire framework about the axis of said bearing means.

5. A jig for prefabricating gable units for buildings comprising a series of pedestals having axially aligned bearing means, and a triangular frame in the general form of a roof truss mounted for swinging movement about the axis of said bearing means, said frame having a fixed base journalled in said bearing means, and fixed, slant sides meeting in an apex and having positioning means for the rafters of a truss, including an end stop and compacting means, and a triangular layout panel secured to said frame and having notches in its slant sides and in its base, and a series of cleats for positioning truss struts, a movable base member arranged for movement in a direction in the plane of the frame and perpendicular to the base of the frame, power means to move said base member, a series of legs depending from the slant sides of the frame, in normal horizontal position of said frame, adjacent the notches in said panel, and having receiving pockets on their lower ends, said slant sides having openings for access to the truss as laid out in the jig, said frame having a section extending perpendicularly therefrom, adjacent the base thereof, upper guide members on said movable base adjacent the notches in the base of said panel, depending perpendicularly from said frame in normal horizontal position of said frame, and lower guide members on the said section of said frame and aligned with the respective, upper guide members, stop means on said section for supporting truss members received in said guide members, power means carried by the slant sides of said frame and adapted to swing the assembled truss upwardly about an axis parallel to and adjacent the base of the main frame, and power means to swing the entire framework about the axis of said bearing means.

6. A jig for prefabricating gable units for buildings comprising a triangular frame in the general form of a roof truss mounted for swinging movement about a horizontal axis, said frame having a fixed base, and fixed, slant sides meeting in an apex and having positioning means for the rafters of a truss, including an end stop and compacting means, and a triangular layout panel secured to said frame and having notches in its slant sides and in its base, and a series of cleats for positioning truss struts, a movable base member arranged for movement in a direction in the plane of the frame and perpendicular to the base of the frame, power means to move said base member, a series of legs depending from the slant sides of the frame, in normal horizontal position of said frame, adjacent the notches in said panel, and having receiving pockets on their lower ends, said slant sides having openings for access to the truss as laid out in the jig, said frame having a section extending perpendicularly therefrom, adjacent the base thereof, upper guide members on said movable base adjacent the notches in the base of said panel, depending perpendicularly from said frame, in normal horizontal position of said frame, and lower guide members on the said section of said frame and aligned with the respective, upper guide members, stop means on said section for supporting truss members received in said guide members, power means carried by the slant sides of said frame and adapted to swing the assembled truss upwardly about an axis parallel to and adjacent the base of the main frame, and power means to swing the entire framework about the axis of said bearing means.

7. A jig for prefabricating gable units for buildings comprising a triangular frame in the general form of a roof truss mounted for swinging movement about a horizontal axis, said frame having a fixed base, and fixed, slant sides meeting in an apex and having positioning means for the rafters of a truss, including an end stop and compacting means, and a triangular layout panel secured to said frame and having notches in its slant sides and in its base, and a series of cleats for positioning truss struts, a movable base member arranged for movement in a direction in the plane of the frame and perpendicular to the base of the frame, a series of legs depending from the slant sides of the frame, in normal horizontal position of said frame, adjacent the notches in said panel, and having receiving pockets on their lower ends, said slant sides having openings for access to the truss as laid out in the jig, said frame having a section extending perpendicularly therefrom, adjacent the base thereof, upper guide members on said movable base adjacent the notches in the base of said panel, depending perpendicularly from said frame, in normal horizontal position of said frame, and lower guide members on said section of said frame and aligned with the respective, upper guide members, stop means on said section for supporting truss members received in said guiding members, power means carried by the slant sides of said frame and adapted to swing the assembled truss upwardly about an axis parallel to and adjacent the base of the main frame, and power means to swing the entire framework about the axis of said bearing means.

8. A jig for prefabricating gable units for buildings comprising a triangular frame in the general form of a roof truss mounted for swinging movement about a horizontal axis, said frame having a fixed base, and fixed, slant sides meeting in an apex and having positioning means for the rafters of a truss, including an end stop and compacting means, and a triangular layout panel secured to said frame and having notches in its slant sides and in its base, and a series of cleats for positioning truss struts, a movable base member arranged for movement in a direction in the plane of the frame and perpendicular to the base of the frame, a series of legs depending from the slant sides of the frame, in normal horizontal position of said frame, adjacent the notches in said panel, and having receiving pockets on their lower ends, said slant sides having openings for access to the truss as laid out in the jig, said frame having a section extending perpendicularly therefrom, adjacent the base thereof, upper guide members on said movable base adjacent the notches in the base of said panel, depending perpendicularly from said frame in normal horizontal position of said frame, and lower guide members on the said section of said frame and aligned with the respective, upper guide members, stop means on said section for supporting truss members received in said guide members, and power means to swing the entire framework about the axis of said bearing means.

9. A jig for prefabricating gable units for buildings comprising a triangular frame in the general form of a roof truss mounted for swinging movement about a horizontal axis, said frame having a fixed base, and fixed, slant sides meeting in an apex and having positioning means for the rafters of a truss, including an end stop and compacting means, and a triangular layout panel secured to said frame and having notches in its slant sides and in its base, and a series of cleats for positioning truss struts, a movable base member arranged for movement in a direction in the plane of the frame and perpendicular to the base of the frame, a series of legs depending from the slant sides of the frame, in normal horizontal position of said frame, adjacent the notches in said panel, and having receiving pockets on their lower ends, said slant sides having openings for access to the truss as laid out in the jig, said frame having a section extending perpendicularly therefrom, adjacent the base thereof, upper guide members on said movable base adjacent the notches in the base of said panel, depending perpendicularly from said frame, in normal horizontal position of said frame, and lower guide members on the depending section of said frame and aligned with the respective, upper guide members, and stop means on said depending section for supporting truss members received in said guide members.

10. A jig for prefabricating gable units for buildings comprising a triangular frame having a panel with positioning means for vertical and diagonal struts, and having a section extending at right angles to the frame near the base thereof, bearing means mounting said frame for swinging movement of its apex about an axis parallel to its base, a base member associated with said frame and movable in the plane thereof, toward and from the apex, upper guide means for truss elements depending from said movable base member in the horizontal position of the frame, and guide means on said extending section aligned with said upper guide means, the slant sides of said frame having guide means for truss elements depending from the plane of said frame, in the horizontal position thereof, means on said jig, adapted to move the apex of a truss above said frame, means on said jig, adapted to move said movable base, and ground-supported means adapted to swing the entire framework about said axis.

11. A jig for prefabricating gable units for buildings comprising a triangular frame having a panel with positioning means for vertical and diagonal struts, and having a section extending at right angles to the frame near the base thereof, means mounting said frame for swinging movement of its apex about an axis parallel to its base, a base member associated with said frame and movable in the plane thereof, toward and from the apex, upper guide means for truss elements depending from said movable base member in the horizontal position of the frame, and guide means on said extending section aligned with said upper guide means, the slant sides of said frame having guide means for truss elements depending from the plane of said frame in the horizontal position thereof.

12. A jig for prefabricating gable units comprising a triangular frame mounted for swinging movement about an axis parallel to its base, guide means for truss struts in the plane of said framework, guide means for framing timbers disposed perpendicularly to said frame along its base and slant sides, a base member on said frame and movable in the plane thereof toward and from the apex, means on said jig, adapted to move said movable member, means on said jig, adapted to tilt the apex of an assembled truss above said frame, means to compact framing elements assembled in said frame, and means to swing said frame about said axis.

13. A jig for prefabricating gable units comprising a triangular frame mounted for swinging movement about an axis parallel to its base, positioning means for truss struts in the plane of said framework, guide means including sockets for receiving joist elements disposed perpendicularly to, and extending from one side of said frame along its base and slant sides and a chordal base member on said frame, arranged for sliding movement in the plane of said frame, toward and from the vertex thereof.

14. A jig for prefabricating gable units comprising a triangular frame mounted for swinging movement about an axis parallel to its base, positioning means for truss struts in the plane of said framework, and guide means including sockets for receiving joist elements disposed perpendicularly to, and extending from one side of, said frame along its base and slant sides.

15. The method of prefabricating a gable unit for buildings which comprises assembling a roof truss with diagonal struts assembling in V-form, the roof rafters of a gable truss, said rafters having lookout notches, inserting lookouts in said notches so as to extend on both sides of said rafters, positioning ceiling joist elements, along a chordal line of said gable truss, perpendicular thereto laying a chordal beam in contact with said rafters, and over said joist elements, securing said beam to said joist elements and said lookouts to said rafters, laying struts within the gable truss and securing same to the rafters and beam, applying sheathing and siding to the gable truss, securing the barge pieces to the outer ends of the lookouts, applying roof sheathing to the lookouts, applying trim on the outer end of the roof sheathing, and securing the first-mentioned truss to the inner ends of the lookouts.

16. The method of prefabricating a gable unit for buildings which comprises laying, in V-form, the roof rafters of a gable truss, having notches in their upper edges, inserting lookouts in the rafter notches so as to extend on both sides of said rafters, positioning the ceiling joists of the gable, laying the base member of said truss over the joists and securing it thereto, and to said rafters, positioning and securing the struts in said truss, applying exterior finish to the gable unit, applying the barges to the outer ends of the lookouts, applying the roof sheathing to the lookouts, and applying trim to the barge and roof sheathing, and attaching a conventional roof truss to the inner ends of said lookouts.

References Cited in the file of this patent

UNITED STATES PATENTS

| | | |
|---|---|---|
| 2,305,124 | Wilson et al. | Dec. 15, 1942 |
| 2,427,133 | Grabner | Sept. 9, 1947 |
| 2,592,359 | Valiton et al. | Apr. 8, 1952 |
| 2,626,643 | Kantzler | Jan. 27, 1953 |
| 2,760,450 | Findleton | Aug. 28, 1956 |
| 2,919,733 | Johnson | Jan. 5, 1960 |
| 2,973,022 | Danielsen et al. | Feb. 28, 1961 |
| 2,983,292 | McKinley | May 9, 1961 |